US011972170B1

(12) United States Patent
McGilliard et al.

(10) Patent No.: US 11,972,170 B1
(45) Date of Patent: Apr. 30, 2024

(54) AUTOMATED CUSTOM MUSIC EXPERIENCES GENERATED USING MACHINE LEARNING

(71) Applicant: Amazon Technologies, Inc., Seattle, WA (US)

(72) Inventors: Christopher L. McGilliard, Seattle, WA (US); Sean Kelly, Oakland, CA (US)

(73) Assignee: Amazon Technologies, Inc., Seattle, WA (US)

( * ) Notice: Subject to any disclaimer, the term of this patent is extended or adjusted under 35 U.S.C. 154(b) by 141 days.

(21) Appl. No.: 17/684,632

(22) Filed: Mar. 2, 2022

(51) Int. Cl.
*G06F 3/16* (2006.01)
*H04R 3/12* (2006.01)

(52) U.S. Cl.
CPC ............ *G06F 3/165* (2013.01); *H04R 3/12* (2013.01)

(58) Field of Classification Search
None
See application file for complete search history.

(56) References Cited

U.S. PATENT DOCUMENTS

| 10,250,650 | B2 * | 4/2019 | Kreifeldt | H04L 65/403 |
| 2008/0162668 | A1 * | 7/2008 | Miller | H04L 65/40 463/40 |
| 2016/0174028 | A1 * | 6/2016 | Shawa | G06Q 30/0261 455/456.1 |
| 2022/0217433 | A1 * | 7/2022 | Krugly | H04N 21/4825 |
| 2022/0279063 | A1 * | 9/2022 | Coffman | G06F 3/0482 |
| 2022/0295133 | A1 * | 9/2022 | Detrick | H04N 21/26258 |

* cited by examiner

*Primary Examiner* — Paul W Huber
(74) *Attorney, Agent, or Firm* — Eversheds Sutherland (US) LLP

(57) ABSTRACT

Systems, methods, and computer-readable media are disclosed for using machine learning to generate automated custom media experiences. Example methods may include determining a first user identifier of a first user present in an environment, determining a first set of media preferences of the first user using media presented in association with the first user identifier, and determining a second user identifier of a second user present in the environment. Methods may include determining a second set of media preferences of the second user using media presented in association with the second user identifier, generating, using a first machine learning model, a first playlist of media using the first set of media preferences and the second set of media preferences for presentation to the first user and the second user, the first playlist comprising first media and second media, and causing audible presentation of the first media.

18 Claims, 7 Drawing Sheets

(12) United States Patent
US 11,972,170 B1

AUTOMATED CUSTOM MUSIC EXPERIENCES GENERATED USING MACHINE LEARNING

BACKGROUND

Music playlists may include curated selections of songs in a particular sequence. Some playlists may be formed based on themes, such as popular music, music genres, and so forth. Users may desire individually generated music playlists based on music tastes or preferences. However, other users may have different music preferences. Accordingly, automated custom music experiences generated using machine learning may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Users may enjoy listening to certain types of music, such as music of certain genres, music from a certain artist or group, and so forth. Digital radio stations or streaming services may provide music recommendations to users, such as songs similar to those the user regularly listens to. Such music recommendations may or may not be enjoyed by the individuals to whom the music recommendations are presented, but users may not always listen to music individually. For example, users may listen to music with others in a physical or digital environment. Accordingly, music recommendations and/or playlists for individuals may not be applicable to groups of more than one person.

Embodiments of the disclosure include automated custom music experiences generated using machine learning for groups of at least two individuals, where the automated custom music experiences may be generated by considering music preferences for individuals present in an environment. The music experiences described herein may include songs and other music in custom generated and dynamically updated playlists that provide a group listening experience with music that may be enjoyable to some or all of the users present in an environment. Environments may be physical environments, such as conference rooms, or digital environments, such as video calls, virtual meetings, virtual reality locations, and so forth. Some embodiments may include trivia features that generate questions based on songs that are played and individual user listening histories, with questions such as "who's favorite is this" or "which two people overlap most on this song," and so forth.

This disclosure relates to, among other things, devices, systems, methods, computer-readable media, techniques, and methodologies for automated custom music experiences generated using machine learning. Certain embodiments may automatically generate playlists based at least in part on users detected in an environment. Embodiments may use one or more machine learning algorithms to select songs or music for inclusion on a playlist, and one or more machine learning algorithms for prioritization and/or sequencing of songs and length of presentation. In some instances, machine learning (e.g., deep neural networks, long short term memory units and/or recurrent neural networks, etc.) may be used to identify various elements of music and/or listening histories that may be used to generate playlists.

Figure 1:
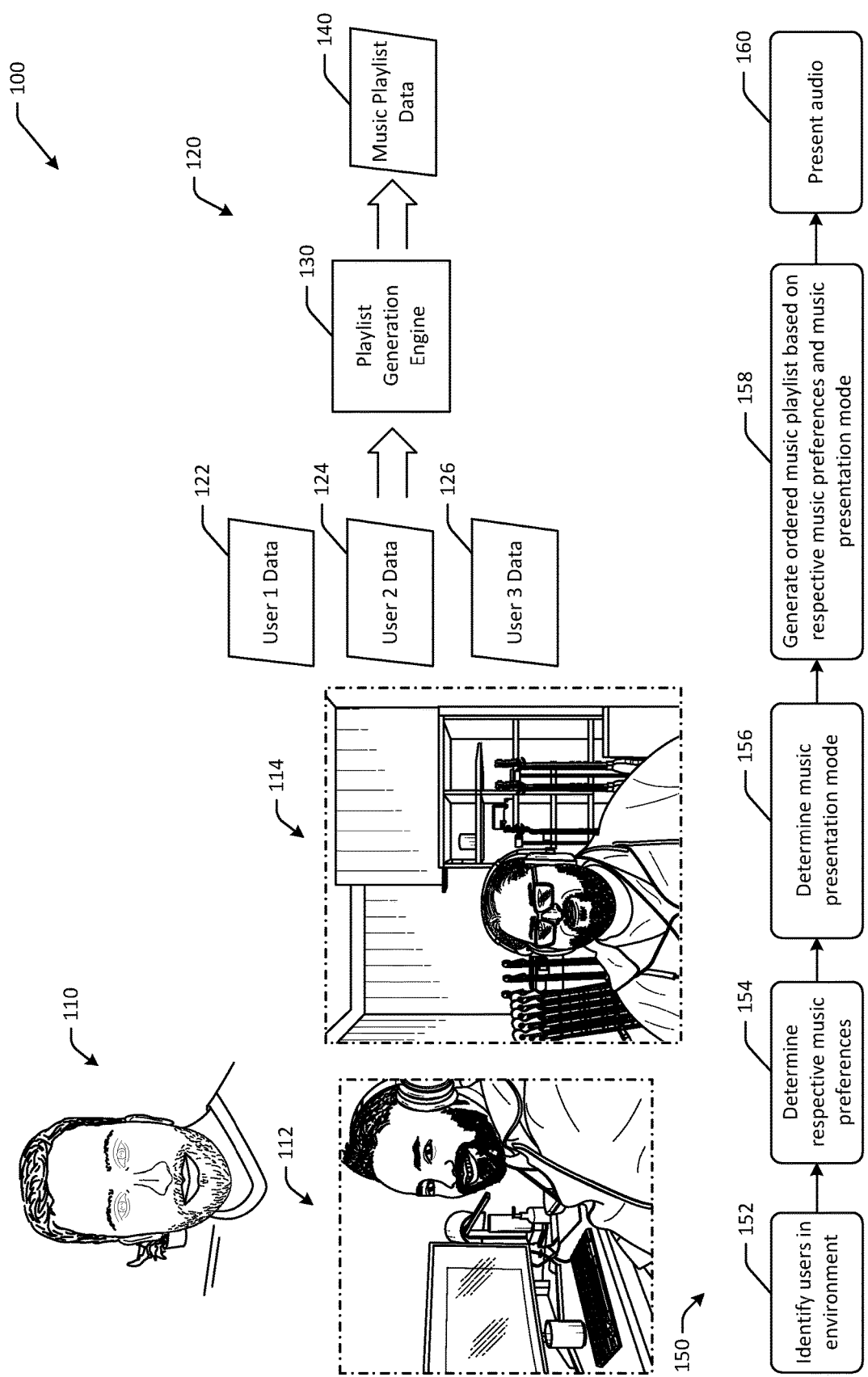
FIG. 1 is a schematic illustration of an example use case for automated custom music experiences generated using machine learning in accordance with one or more example embodiments of the disclosure.

Referring to FIG. 1, an example use case 100 for automated custom music experiences generated using machine learning is depicted in accordance with one or more example embodiments of the disclosure. In the example of FIG. 1, a first user 110, a second user 112, and a third user 114 may be present in a virtual environment. Embodiments may generated a custom music experience for the three users in the environment, where the music experience includes songs that some or all of the users may find enjoyable. In some embodiments, probability values may be generated for individual users and/or the group of users to determine whether to include a song on the playlist and/or whether to prioritize playback of a particular song. For example, user data, such as listening histories may be determined for users present in the environment and used to generate the music playlist. In an example data flow 120 of FIG. 1, first user data 122 for the first user 110, second user data 124 for the second user 112, and third user data 126 for the third user 114 may be determined and input at a playlist generation engine 130. The playlist generation engine 130 may include one or more neural networks that may be used to analyze the respective listening histories and/or other user data.

The playlist generation engine 130 may use listening histories and/or music profile data (e.g., user classifications, etc.) for the individual users to determine music playlist data 140, where the music playlist data 140 includes an ordered arrangement of songs to present to the users via their respective user devices. In some embodiments, the music playlist data 140 may include a segment length or length of time that a particular song is presented. For example, a song with a relatively low probability of being enjoyed by the users may be presented for a relatively shorter time than a song with a relatively higher probability of being enjoyed by the users.

As a result, the users in the environment may enjoy a custom generated music experience that each of the users in the group is likely to find enjoyable. To generate custom music experiences, an example process flow 150 is presented and may be performed, for example, by one or more playlist generation or playlist curation engines at one or more remote servers. The remote server and/or computer system may include at least one memory that stores computer-executable instructions and at least one processor configured to access the at least one memory and execute the computer-executable instructions to perform various actions or operations, such as one or more of the operations in the process flow 150 of FIG. 1.

At a first block 152, the remote server may identify uses in an environment. For example, the remote server may determine users logged into a virtual environment, and/or users present in a physical environment. For physical environments, users may be identified based at least in part on devices associated with the user (such as a phone, laptop, etc.), based at least in part on the user's voice, based at least in part on physical characteristics of the user, and so forth. For virtual environments, the remote server may determine a set of user identifiers in attendance at the virtual environment, and may determine a first user identifier using the set of user identifiers. For physical environments, the remote server may, in one example, detect a first user device in the physical environment, and may determine the first user identifier associated with the first user device.

At a second block 154, the remote server may determine respective music preferences. For example, music preferences associated with the individual users present in an environment may be determined. At a third block 156, the remote server may determine a music presentation mode. For example, a Discovery Mode may be used to find songs that are new to a majority of users or for all users, whereas a Hits Mode may be used to play songs that are favorites amongst the users. At a fourth block 158, the remote server may generate an ordered music playlist based at least in part on the respective music preferences and the music presentation mode. The remote server may implement one or more machine learning algorithms to select and/or sequence songs in the playlist. At a fifth block 160, the remote server may present audio at one or more devices in the environment and/or at devices used to access the environment.

Embodiments of the disclosure may include automated custom music experiences generated using machine learning, and may include one or more modules that can be used to analyze music preferences. Certain embodiments may use one or more audio processing modules or algorithms (e.g., music genre recognition modules, etc.) to identify features of music listened to by individual users.

Example embodiments of the disclosure provide a number of technical features or technical effects. For example, in accordance with example embodiments of the disclosure, certain embodiments of the disclosure may automatically analyze audio components of content. Certain embodiments may generate custom music experiences for a plurality of users using machine learning. As a result of improved functionality, custom music playlists may be generated. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
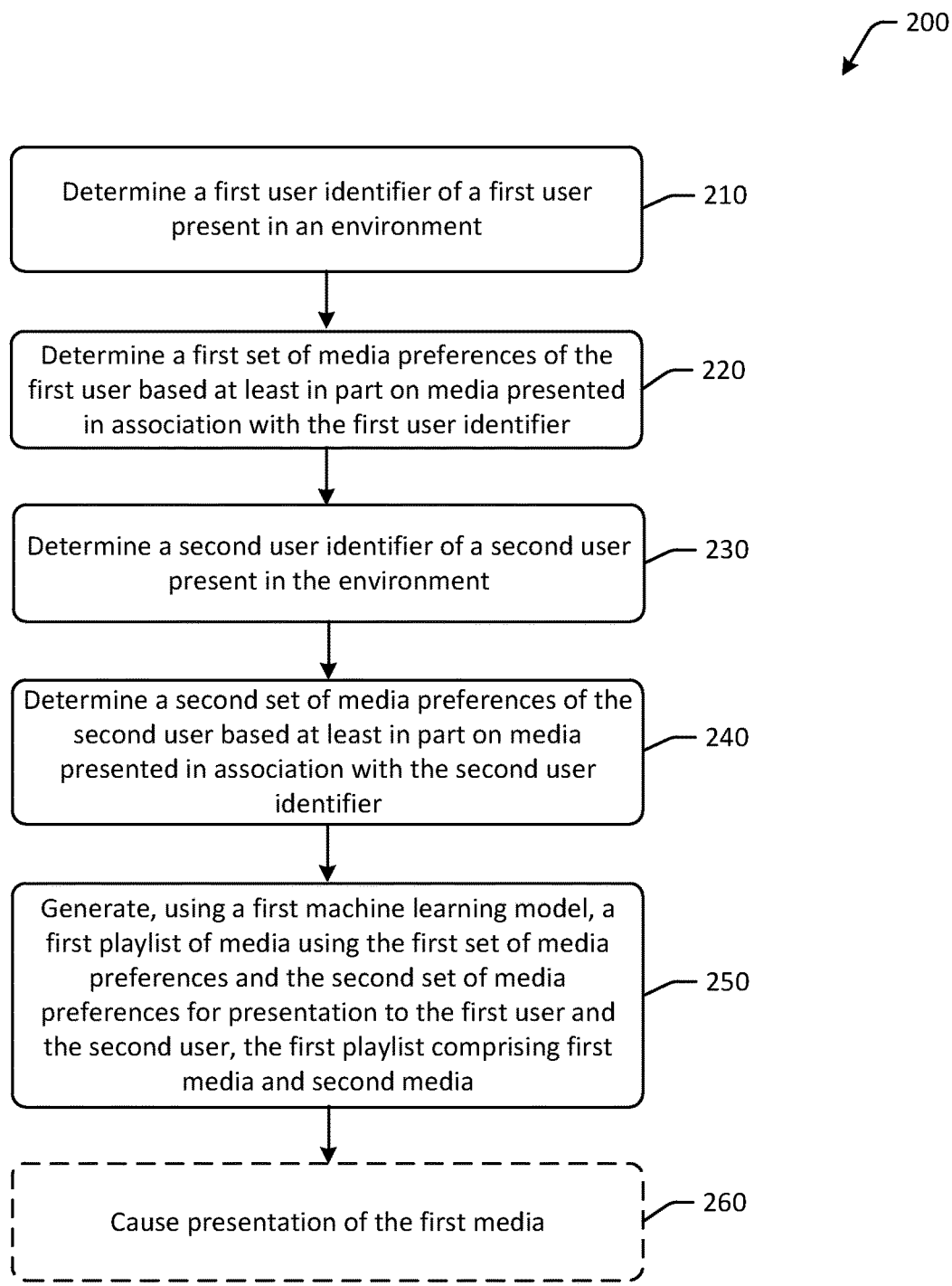
FIG. 2 is a schematic illustration of an example process flow for automated custom music experiences generated using machine learning in accordance with one or more example embodiments of the disclosure.

FIG. 2 depicts an example process flow 200 for automated custom music experiences generated using machine learning in accordance with one or more example embodiments of the disclosure. While example embodiments of the disclosure may be described in the context of individual songs, it should be appreciated that the disclosure is more broadly applicable to any type of music classification, such as artist, genre, album, etc. In addition, other embodiments may generate playlists for other types of media, such as podcasts, speeches, audio books, videos, and so forth. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to determine a first user identifier of a first user present in an environment. For example, a song selection engine and/or one or more playlist generation modules at a remote server may determine a first user identifier of a first user present in an environment. Environments may be digital environments, such as virtual meetings, video calls, audio calls, etc., or physical environments, such as conference rooms, concert halls, buildings, and other facilities. The user identifier may be an identifier of a user present in the environment, such as a username or other identifier. For digital environments, user identifiers may be determined based on users logged into the environment, users present in the environment, attendees to a meeting, users invited to a meeting, users present on a call, and so forth. For physical environments, user identifiers may be determined based at least in part on devices detected in the environment, devices connected to a certain network, user identifiers of users identified via voice or facial imaging, and so forth. The set of user identifiers present in an environment may be dynamically updated as users join and/or leave the environment. For example, updates to the present users may be event based, such as the addition or removal of a user from the environment, or may be periodic, such as every five minutes, after a song is completed, and so forth.

At block 220 of the process flow 200, computer-executable instructions stored on a memory of a device, such as a remote server or a user device, may be executed to determine a first set of media or music preferences of the first user based at least in part on media presented in association with the first user identifier. For example, the song selection engine and/or one or more machine learning modules at a remote server may determine a first set of music preferences of the first user based at least in part on music presented in association with the first user identifier. The first set of music preferences may be based at least in part on recent music selections for the user, such as over the previous 90 days or another time interval, so as to accommodate changes in music preferences over time. The music preferences may be indicative of genre, artists, respective lengths of listening time, and other metrics related to music consumed by a particular user. In some embodiments, the music preferences may be used to classify the user into a particular category, whereas in other embodiments, the music preferences may be processed to determine characteristics of individual songs listened to by a user, in conjunction with a length of listening time, a frequency of listening, and other metrics. Such metrics may be used to determine songs the user may enjoy listening to. In some embodiments, music preferences may be determined using machine learning and/or neural networks, such as a two-dimensional convolutional neural network in some embodiments.

At block 230 of the process flow 200, computer-executable instructions stored on a memory of a device, such as a remote server or a user device, may be executed to determine a second user identifier of a second user present in the environment. For example, the song selection engine and/or one or more playlist generation modules at a remote server may determine a second user identifier of a second user present in an environment. Environments may be digital environments, such as virtual meetings, video calls, audio calls, etc., or physical environments, such as conference rooms, concert halls, buildings, and other facilities. The user identifier may be an identifier of a user present in the environment, such as a username or other identifier. For digital environments, user identifiers may be determined based on users logged into the environment, users present in the environment, attendees to a meeting, users invited to a meeting, users present on a call, and so forth. For physical environments, user identifiers may be determined based at least in part on devices detected in the environment, devices connected to a certain network, user identifiers of users identified via voice or facial imaging, and so forth. The set of user identifiers present in an environment may be dynamically updated as users join and/or leave the environment. For example, updates to the present users may be event based, such as the addition or removal of a user from the environment, or may be periodic, such as every five minutes, after a song is completed, and so forth.

At block 240 of the process flow 200, computer-executable instructions stored on a memory of a device, such as a remote server or a user device, may be executed to determine a second set of media or music preferences of the second user based at least in part on media presented in association with the second user identifier. For example, the song selection engine and/or one or more machine learning modules at a remote server may determine a first set of music preferences of the second user based at least in part on music presented in association with the second user identifier. The second set of music preferences may be based at least in part on recent music selections for the user, such as over the previous 90 days or another time interval, so as to accommodate changes in music preferences over time. The music preferences may be indicative of genre, artists, respective lengths of listening time, and other metrics related to music consumed by a particular user. In some embodiments, the music preferences may be used to classify the user into a particular category, whereas in other embodiments, the music preferences may be processed to determine characteristics of individual songs listened to by a user, in conjunction with a length of listening time, a frequency of listening, and other metrics. Such metrics may be used to determine songs the user may enjoy listening to. In some embodiments, music preferences may be determined using machine learning and/or neural networks, such as a two-dimensional convolutional neural network in some embodiments.

At block 250 of the process flow 200, computer-executable instructions stored on a memory of a device, such as a remote server or a user device, may be executed to generate, using a first machine learning model, a first playlist of songs using the first set of music preferences and the second set of music preferences for presentation to the first user and the second user, the first playlist comprising a first song and a second song. For example, a playlist curation engine at a remote server may generate, using a first machine learning model, a first playlist of songs using the first set of music preferences and the second set of music preferences for presentation to the first user and the second user, the first playlist comprising a first song and a second song. The first playlist of songs may be generated using one or more operations. For example, the playlist curation engine may determine a set of songs that are suitable for inclusion in the first playlist from the song selection engine. The playlist curation engine may be configured to determine a sequence of songs based at least in part on probability values indicative of a likelihood that the song will be enjoyed by users in the environment. In some embodiments, the playlist curation engine may determine the probability values using a neural network or machine learning algorithm. The playlist curation engine may further determine a length of time each song in the first playlist will be played. Factors such as whether a song has been heard by users in the environment may be used to determine the sequence of songs, where songs may be prioritized not only based on associated probability values, but on factors such as whether the users are interested in hearing new music (e.g., whether a Discovery Mode is active for the first playlist, etc.), a divergence in music preferences amongst the group of users in the environment, and so forth. For instance, if the music preferences diverge greatly, then songs selected that a minority of users may enjoy may be played or presented for a shorter duration than songs that a majority of users may enjoy. Accordingly, the playlist curation engine may dynamically modify playback times in addition to generation and sequencing of the first playlist.

In some embodiments, additional factors, such as a location of an environment (or a device in an environment) may be used to determine a subset of media preferences that are to be used for playlist generation. For example, the playlist curation engine may determine a location associated with the environment. The location may be a gym environment, a conference room environment, a beach environment, or a different type of environment, and such location data may be used to determine a subset of media preferences for a particular user. For example, the same user may have different media consumption preferences at different locations, such as during exercise and during a workday.

At optional block 260 of the process flow 200, computer-executable instructions stored on a memory of a device, such as a remote server or a user device, may be executed to cause audible presentation of the first song. For example, the playlist curation engine at a remote server may cause audible presentation of the first song. Presentation of audio may be at one or more devices. For example, in a digital or virtual environment, playback of audio may be synchronized across the devices from which users are using to access the digital environment. For physical environments, one or more physical devices may also be used to present audio, such as a voice assistant device or speaker device in a conference room, one or more primary playback devices (e.g., a certain user's computer, etc.), and/or another device(s) present in the physical environment.

Figure 3:
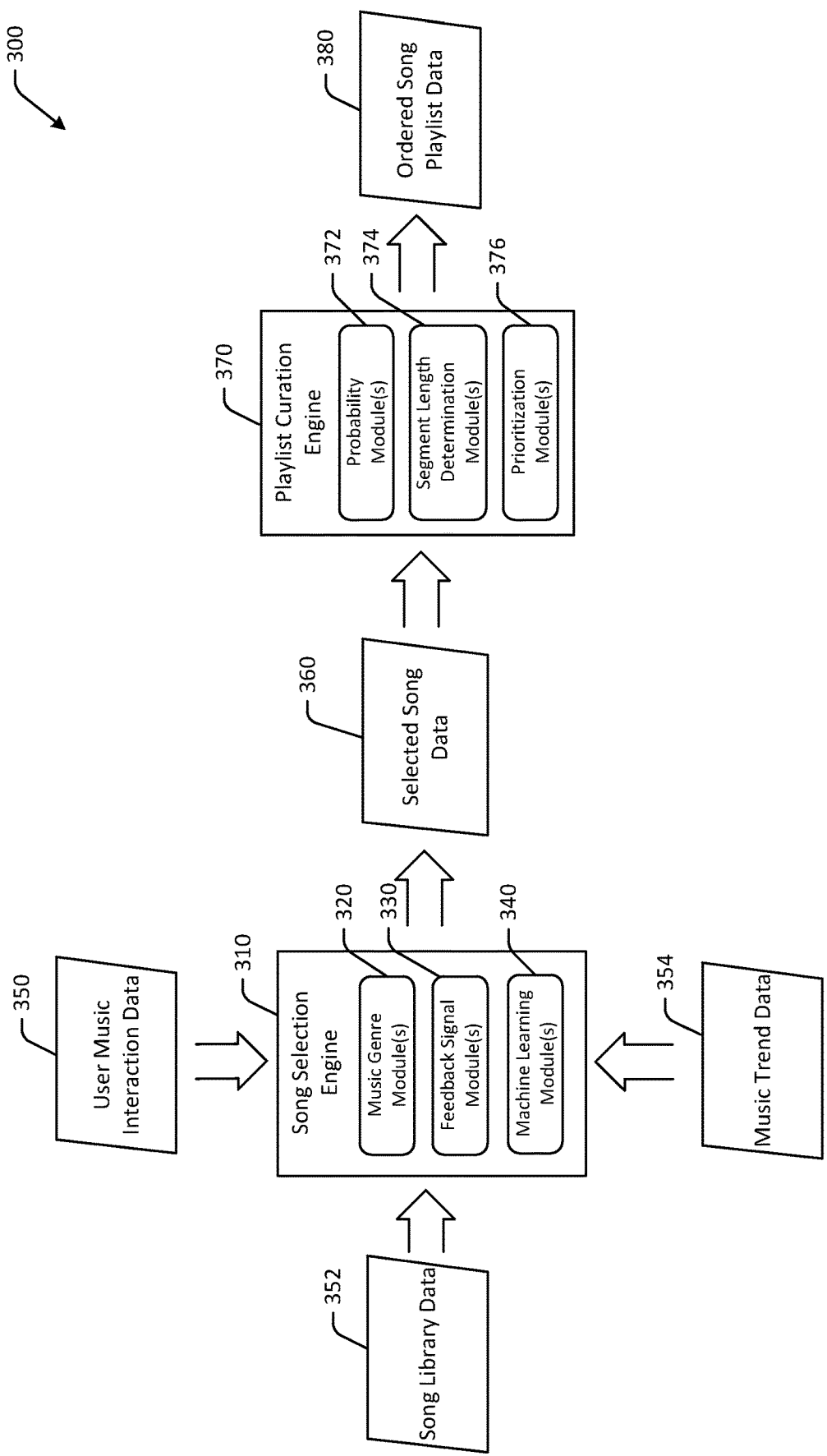
FIG. 3 is a schematic illustration of an example data and process flow for generating custom music experiences using machine learning in accordance with one or more example embodiments of the disclosure.

FIG. 3 is a schematic illustration of an example data and process flow for generating custom music experiences using machine learning in accordance with one or more example embodiments of the disclosure. Different embodiments may include different, additional, or fewer inputs or outputs than those illustrated in the example of FIG. 3.

In FIG. 3, an example data and process flow 300 is schematically depicted. A song selection engine 310 and/or one or more song selection module(s) may be configured to determine music preferences of users in an environment and to output selected song data 360. Music preferences may include artist preferences, genre preferences, theme preferences, volume of presentation preferences, and/or other preferences or metrics related to music consumed by individual users in an environment, where the preferences may be specific to a time interval, such as the last 30 days in some embodiments. The song selection engine 310 may be stored at and/or executed by one or more remote servers. The song selection engine 310 may determine one or more inputs, such as user music interaction data 350, song library data 352, and/or music trend data 354. The user music interaction data 350 may include data related to music recently consumed by a user, such as songs that were skipped, songs that were liked, songs that were disliked, radio stations that were selected for playback, lengths of times individual songs were played, a number of times a song and/or artist was played, and so forth. The song library data 352 may include songs that are available for inclusion in a custom generated playlist, and may include various attributes of such songs, such as genre, artist, etc. The music trend data 354 may include recent listening trends for a user, as well as general music trend data, such as currently popular songs and other trend data.

The song selection engine 310 may include one or more modules or algorithms, and may be configured to output the selected song data 360, which may be a set of songs that may be enjoyable to some or all of the users in an environment. In some embodiments, the selected song data 360 may be ranked or ordered, whereas in other embodiments, the selected song data 360 may not be ranked or ordered. For example, the song selection engine 310 may include one or more music genre module(s) 320, one or more feedback signal module(s) 330, and/or one or more machine learning module(s) 340. Additional or fewer, or different, modules may be included. The music genre module(s) 320 may be configured to process and/or analyze music content to determine music preferences for users. For example, the music genre module(s) 320 may be configured to classify users into different categories of music listeners based at least in part on attributes of music listened to by the user.

The feedback signal module(s) 330 may be configured to process and/or analyze feedback signals associated with the user's music listening sessions, such as songs that are liked or repeated by the user, songs that are skipped by the user, artists that are searched for by the user, songs that are searched for by the user, songs that are disliked, lengths of time that a song is listened to, frequency of playback for a song or artist, and so forth. The feedback signal module(s) 330 may aggregate such factors and communicate with the machine learning module(s) 340 to determine a probability value indicative of a likelihood a particular user will enjoy hearing a certain song. The feedback signal module(s) 330 may therefore include one or more algorithms configured to detect audio features in songs, such as theme or genre and the like.

The machine learning module(s) 340 may be configured to determine a probability value indicative of a likelihood a particular user will enjoy hearing a certain song. For example, the song selection engine 310 may use the music genre module(s) 320 to identify a potential set of songs for a custom playlist, and may use the feedback signal module(s) 330 in conjunction with the machine learning module(s) 340 to determine a probability value indicative of a likelihood a particular user will enjoy hearing a certain song. The machine learning module(s) 340 may further determine aggregate probabilities for a plurality of users in the environment.

Using one or more algorithms or modules, the song selection engine 310 may output the selected song data 360. For example, the song selection engine 310 may select songs having probability values greater than a first threshold, where the probability values are for the aggregate users in the environment and indicative of a likelihood that the plurality of users together will enjoy the song. In other embodiments, the song selection engine 310 may select songs using probability values for individual users in the environment. For example, if the probability values for more than half the users satisfies a second threshold (which may be the same or a different threshold than the first threshold), the song selection engine 310 may include the song in the selected song data 360.

The selected song data 360 may be input at a playlist curation engine 370 and/or one or more playlist generation module(s). The playlist curation engine 370 may be configured to automatically generate custom playlists based on the music preferences of users present in an environment. The playlist curation engine 370 may generate updated playlists dynamically as users join or leave an environment. The playlist curation engine 370 may implement one or more neural networks to generate playlists and/or corresponding updates.

The playlist curation engine 370 may include one or more probability module(s) 372, one or more segment length determination module(s) 374, and/or one or more prioritization module(s) 376. Other embodiments may have additional, fewer, and/or different modules. The playlist curation engine 370 may be configured to implement the probability module(s) 372 to determine corresponding probability values (e.g., individual user probability values or aggregate user probability values for users in an environment, etc.) for songs in the selected song data 360. In embodiments where the song selection engine 310 does not generate the probability values, the playlist curation engine 370 may implement the probability module(s) 372 to determine the probability values.

The playlist curation engine 370 may execute or implement the segment length determination module(s) 374 to determine a length of time that any song in the selected song data 360 will be presented. the segment length determination may be based at least in part on the probability value for the aggregate users, where the greater the probability that users will enjoy the song, the longer the segment of the song the segment length determination module(s) 374 may determine should be presented. In contrast, the lower the probability, the shorter the segment. In some embodiments, the segment length may be determined based at least in part on how many users in the environment may enjoy the song (e.g., individual probability values greater than a threshold, etc.).

The playlist curation engine 370 may execute or implement the prioritization module(s) 376 to determine a ranking or sequence of songs that are to be presented. The sequence may be based at least in part on the probability values for the users in the environment (e.g., either or both aggregate probabilities and individual probabilities, etc.).

The playlist curation engine 370 may therefore output ordered song playlist data 380. The ordered song playlist data 380 may include the songs for presentation to the users in the environment, and may optionally include segment lengths for the different songs. The ordered song playlist data 380 may be updated periodically during a listening session and/or as users join or leave the environment.

The ordered song playlist data 380 may also be updated using feedback in or near real-time from users consuming media, such as a "like" or "dislike" signal, a "skip" signal, and so forth. Such feedback signals may be used to optimize both the sequence of media that is presented, as well as the media selected for inclusion in the playlist. The playlist curation engine 370 may therefore determine a set of feedback signals during presentation of the first playlist of media, and may generate, using the first machine learning model, a second playlist or an updated playlist of media using the set of feedback signals.

Figure 4:
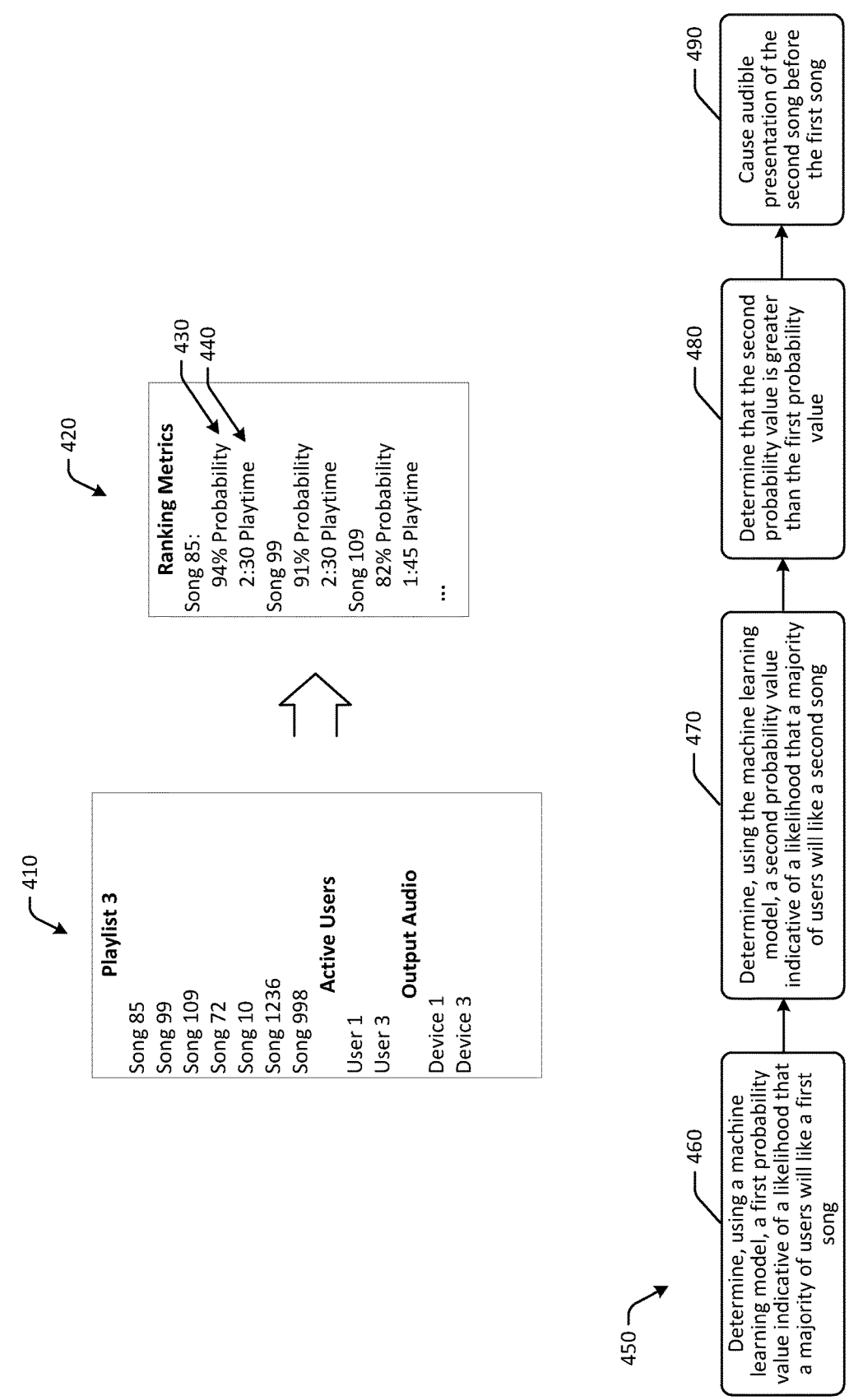
FIG. 4 is a schematic illustration of example automated sequencing and prioritization of music in accordance with one or more example embodiments of the disclosure.

FIG. 4 is a schematic illustration of example automated sequencing and prioritization of music in accordance with one or more example embodiments of the disclosure. While example embodiments of the disclosure may be described in the context of individual songs, it should be appreciated that the disclosure is more broadly applicable to any type of music classification, such as artist, genre, album, etc. Some or all of the blocks of the process flows in this disclosure may be performed in a distributed manner across any number of devices. The operations of the process flow may be optional and may be performed in a different order.

In FIG. 4, a sample automated playlist generated using machine learning 410 is depicted. The automated playlist generated using machine learning 410 may include a number of songs (identified by song identifiers), and may have been generated for users present in a particular environment. The automated playlist generated using machine learning 410 may be presented at one or more devices, such as the device in a particular environment and/or devices associated with a particular user.

The automated playlist generated using machine learning 410 may be generated based at least in part on ranking metrics 420. For example, for particular songs, a remote server may determine probability values 430 indicative of a likelihood that users in the group (individually or as a whole, or both) will enjoy the song. The remote server may further determine a segment length 440 indicative of a length of the song that is to be presented. The remote server may determine such values for some or all of the songs in the automated playlist generated using machine learning 410. In some embodiments, the remote server may sequence the songs based at least in part on the probability values. For example, the remote server may prioritize audible presentation of a first song before a second song based at least in part on a number of users present in the environment that like the first song. If a greater number of users have indicated they like the first song relative to the number of users that indicated they like the second song, the first song may be prioritized for presentation over the second song.

In some embodiments, the remote server may execute process flow 450 to determine a sequence or arrangement of songs for playback. At block 460, the remote server may determine, using a machine learning model, a first probability value indicative of a likelihood that a majority of users will like the first song. The first probability value may be the probability value 430 depicted in the example of FIG. 4. In other embodiments, a different probability value, such as an aggregate probability value for all of the users present in the environment, may be determined. At block 470, the remote server may determine, using the machine learning model, a second probability value indicative of a likelihood that a majority of users will like a second song. The second probability value may be the probability value 430 depicted in the example of FIG. 4. In other embodiments, a different probability value, such as an aggregate probability value for all of the users present in the environment, may be determined. At block 480, the remote server may determine that the second probability value is greater than the first probability value. At block 490, the remote server may cause audible presentation of the third song before the first song.

In other embodiments, prioritization of songs can be determined by an active operation mode during the listening session. For example, users may select a "Discovery Mode" where songs that some or all of the users in the environment have not previously heard may be prioritized over songs that users are familiar with, so as to allow users to discover new music. Accordingly, the remote server may determine whether songs are present or are not found in a first listening history and/or media consumption history (which may include media other than music, such as podcasts, videos, speeches, audio books, and so forth) associated with a first user identifier and a second listening history and/or media consumption history associated with a second user identifier. If the songs are not found in the respective listening histories, the song may be new and may be prioritized during a Discovery Mode listening session.

Segment lengths 440 may be varied based at least in part on the probability values 430. For example, the remote server may cause audible presentation of a segment of the first song having a first length, and may determine, using a second machine learning model, that a first probability value indicative of a likelihood that a majority of users will like the first song is greater than a threshold. After audible presentation of the segment of the first song, the remote server may cause audible presentation of a segment of the second song having a second length that is shorter than the first song, in the instance where the second song has a lower probability value of being enjoyed by the users than the first song. In this manner, the general listening session for the users may include music that has a threshold likelihood of being found enjoyable.

Figure 5:
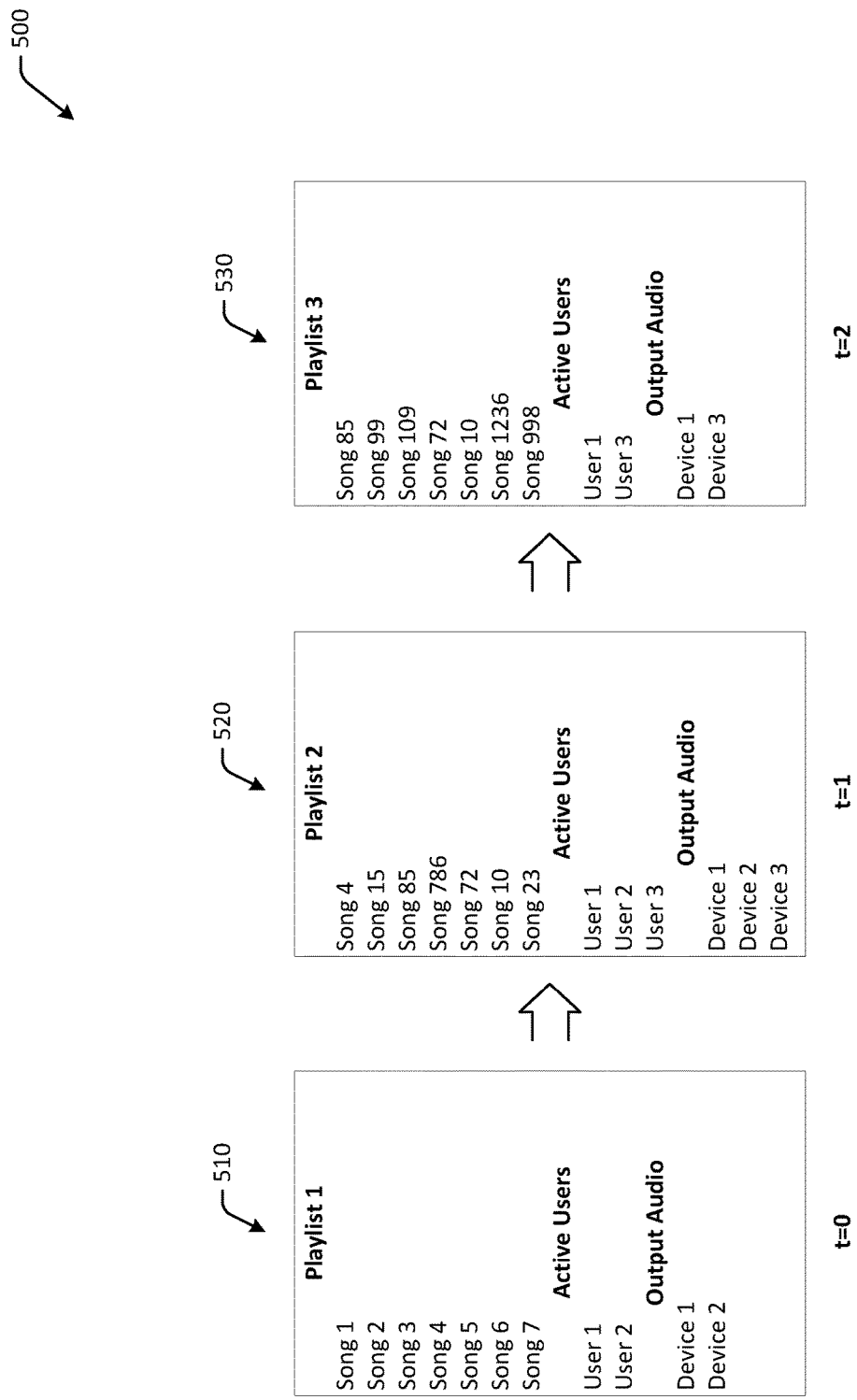
FIG. 5 is a schematic illustration of example dynamic modification of automatically generated playlists in accordance with one or more example embodiments of the disclosure.

FIG. 5 is a schematic illustration of example dynamic modification of automatically generated playlists in accordance with one or more example embodiments of the disclosure. While example embodiments of the disclosure may be described in the context of individual songs, it should be appreciated that the disclosure is more broadly applicable to any type of music classification, such as artist, genre, album, etc. Other embodiments may include different user interface components.

In FIG. 5, an automated playlist generated using machine learning is depicted at various points in time, such as at a first point in time 510 t=0, a second point in time 520 t=1, a third point in time 530 t=2, and so forth. The automated playlist generated using machine learning may change over time based at least in part on a composition of users present in the environment. When a user joins an environment or leaves the environment, the automated playlist generated using machine learning may be modified to account for the user's music preferences or to remove the user's music preferences, resulting in an updated playlist, as reflected by the labeling of Playlist 1, Playlist 2, Playlist 3, etc. in FIG. 5.

For example, at the first point in time 510, the automated playlist generated using machine learning may include a first set of songs that are generated for a first group of users in the environment and presented at a particular set of output audio devices. At the second point in time 520, a new user, User 3 may join User 1 and User 2 in the environment. Accordingly, the automated playlist generated using machine learning may be updated to account for the music preferences for User 3. Updates may include changes to the selected songs, changes to song sequences, changes to segment lengths for songs to be presented, and so forth. At the third point in time 530, User 2 may leave the environment, and the automated playlist generated using machine learning may again be updated to remove the music preferences of User 2, with the corresponding changes to the automated playlist generated using machine learning.

In one embodiment, the remote server may determine a third user identifier of a third user present in the environment, and may determine a third set of music preferences of the third user based at least in part on music presented in association with the third user identifier. The remote server may generate, using a machine learning model, a second playlist of songs using the first set of music preferences of the first user, the second set of music preferences of the second user, and the third set of music preferences of the third user for presentation to the first user, the second user, and the third user.

In another example, when a user leaves, the remote server may determine that the second user is no longer present in the environment, and may generate, using the machine learning model, a third playlist of songs using the first set of music preferences and the third set of music preferences for presentation to the first user, and the third user.

Figure 6:
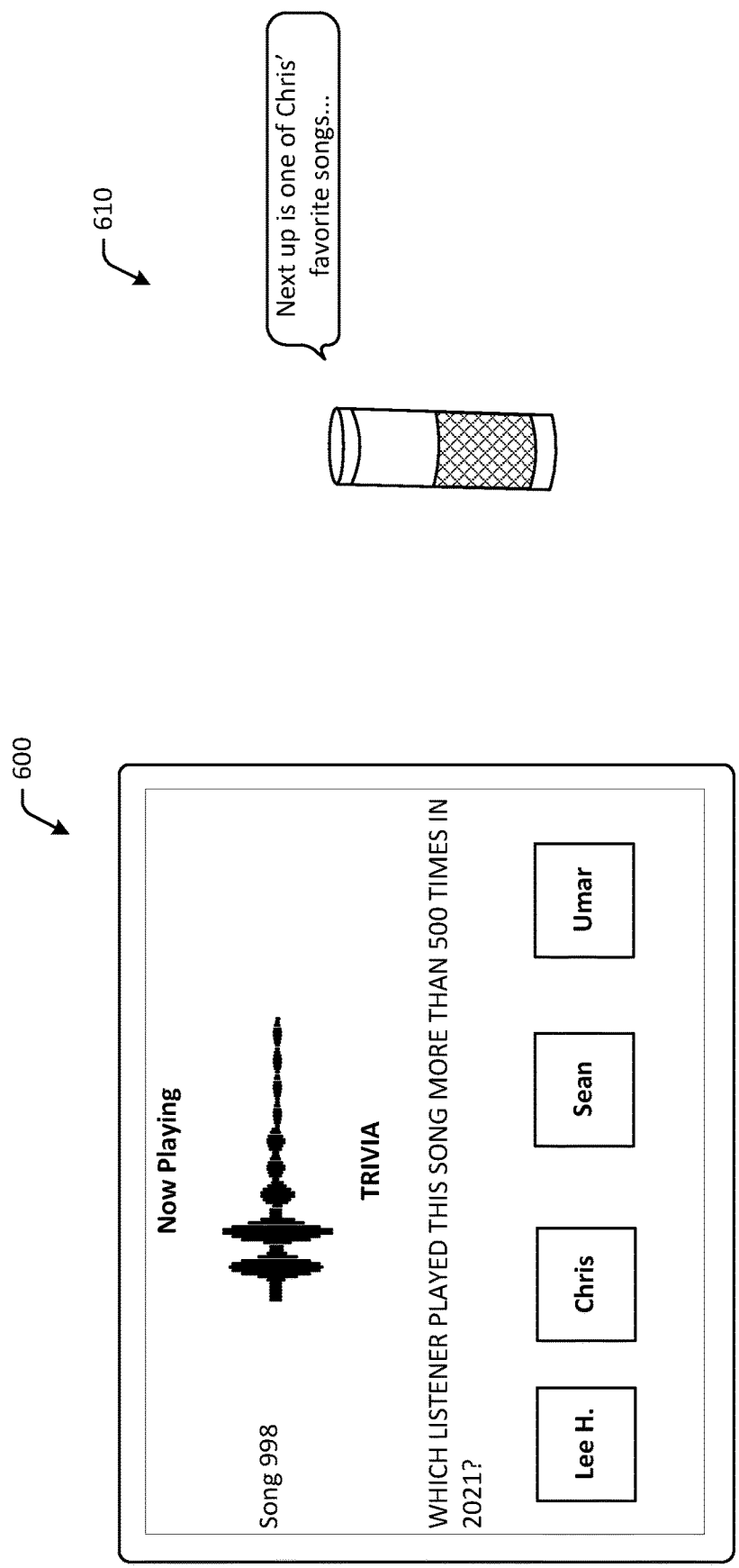
FIG. 6 is a schematic illustration of an example trivia user interface and voice assistant-based interaction in accordance with one or more example embodiments of the disclosure.

FIG. 6 depicts an example trivia user interface 600 and voice assistant-based interaction in accordance with one or more example embodiments of the disclosure. Other embodiments may include additional or fewer components than those depicted in the example of FIG. 6. The process described with respect to FIG. 6 may be implemented using the systems described herein.

In FIG. 6, some embodiments may generate interactive user interfaces for users during listening sessions. For example, data related to songs presented during presentation of an automated playlist generated using machine learning may be used to generate questions or trivia about a song being presented. In the example of FIG. 6, a sample trivia question of "which listener played this song more than 500 times in 2021?" is presented, where the question may be generated based at least in part on the listening histories of the users in the group. For example, the remote server may generate a question associated with Song 998 and present the question to users present in the environment. In this example, the song may be found in a first listening history associated with a first user identifier, and may not necessarily be found in a second listening history associated with a second user identifier. Other questions may be generated from a bank of questions using real-time data associated with songs presented as part of the automated playlist generated using machine learning. In addition, for speaker-based devices, such as voice assistant devices, the remote server may determine listening data associated with a song, and may present the listening data using a speaker and/or at a display coupled to the device. For example, a voice assistant device 610 may audibly present a statement "next up in one of Chris' favorite songs" before presenting the song Chris listened to the most in the past 90 days, for instance. Other data may be used to present facts or questions related to the users in the environment and corresponding music on the automated playlist generated using machine learning.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 7:
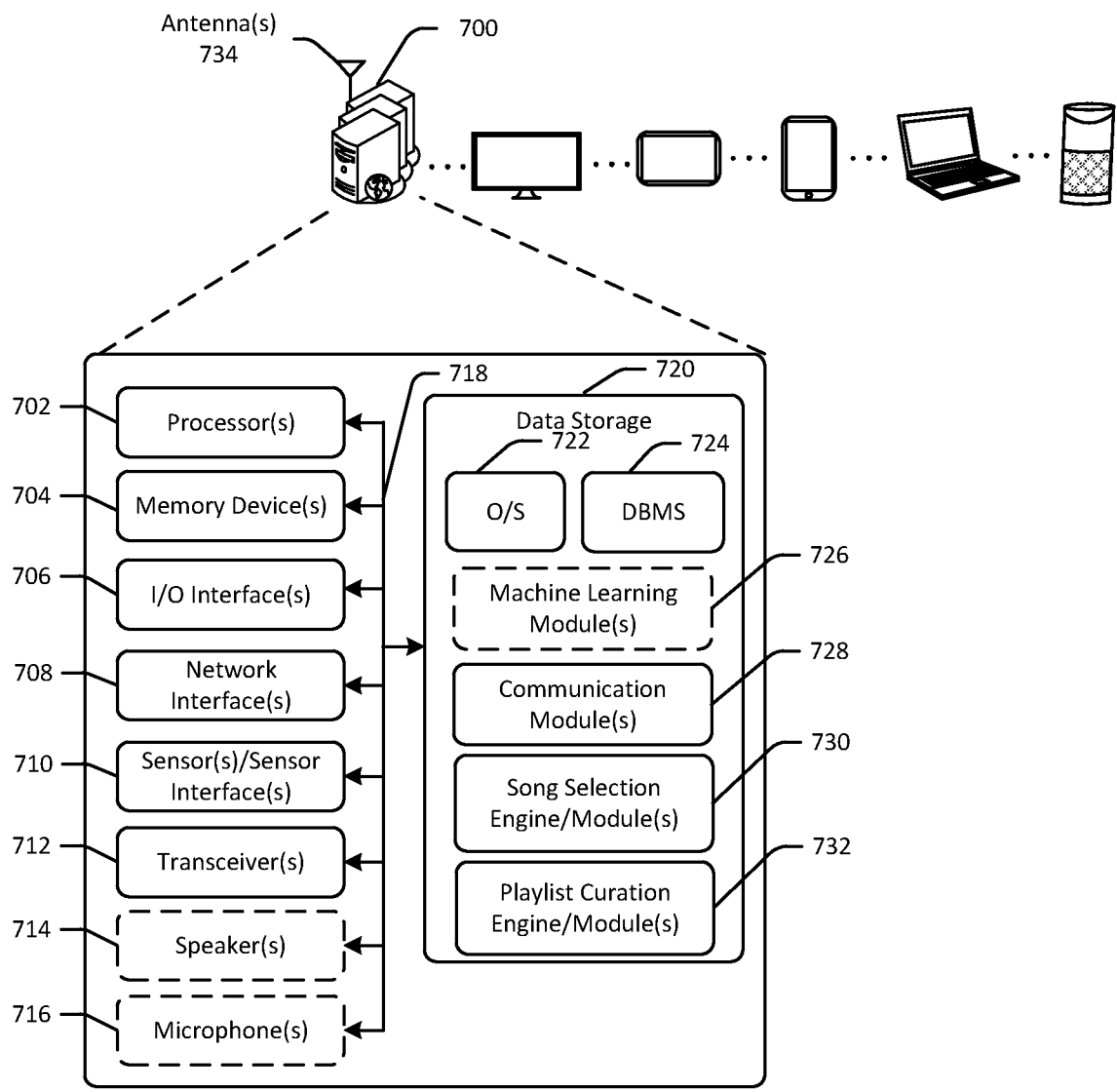
FIG. 7 is a schematic block diagram of an illustrative device in accordance with one or more example embodiments of the disclosure.

FIG. 7 is a schematic block diagram of an illustrative remote server 700 in accordance with one or more example embodiments of the disclosure. The remote server 700 may include any suitable computing device capable of receiving and/or sending data including, but not limited to, a mobile device such as a smartphone, tablet, e-reader, wearable device, or the like; a desktop computer; a laptop computer; a content streaming device; a set-top box; or the like. The remote server 700 may correspond to an illustrative device configuration for the devices of FIGS. 1-6.

The remote server 700 may be configured to communicate via one or more networks with one or more servers, search engines, user devices, or the like. In some embodiments, a single remote server or single group of remote servers may be configured to perform more than one type of custom playlist generation, presentation, rendering, and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 700 may include one or more processors (processor(s)) 702, one or more memory devices 704 (generically referred to herein as memory 704), one or more input/output (I/O) interface(s) 706, one or more network interface(s) 708, one or more sensors or sensor interface(s) 710, one or more transceivers 712, one or more optional speakers 714, one or more optional microphones 716, and data storage 720. The remote server 700 may further include one or more buses 718 that functionally couple various components of the remote server 700. The remote server 700 may further include one or more antenna(s) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the remote server 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the remote server 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more optional machine learning module(s) 726, one or more communication module(s) 728, one or more song selection engine/module(s) 730, and/or one or more playlist curation engine/module(s) 732. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the remote server 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, music preference information, user action information, historical content consumption information, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the remote server 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the optional machine learning module(s) 726 may include computer-executable instructions, code, or the like that responsive to execution by one or more of the processor(s) 702 may perform functions including, but not limited to, determining music preference data, determining user interactions with generated playlists, determining or detecting actions and/events, generating one or more machine learning models or algorithms, determining or classifying feedback signals, determining song themes, generating playlists, determining user identifiers of users in an environment, and the like.

The communication module(s) 728 may include computer-executable instructions, code, or the like that responsive to execution by one or more of the processor(s) 702 may perform functions including, but not limited to, communicating with one or more devices, for example, via wired or wireless communication, communicating with remote servers, communicating with remote datastores, sending or receiving notifications or commands/directives, communicating with cache memory data, communicating with user devices, and the like.

The song selection engine/module(s) 730 may include computer-executable instructions, code, or the like that responsive to execution by one or more of the processor(s) 702 may perform functions including, but not limited to, analyzing digital content, extracting audio, determining song classifications, determining audio content, determining or analyzing audio files, identifying certain portions of content, extracting segments of content, determining user preferences and/or related data, selecting songs from a library, and the like.

The playlist curation engine/module(s) 732 may include computer-executable instructions, code, or the like that responsive to execution by one or more of the processor(s) 702 may perform functions including, but not limited to, determining sequences for songs in a playlist, determining playback lengths of time, determining prioritization for songs, modifying playback or presentation speed, generating search results, and the like.

Referring now to other illustrative components depicted as being stored in the data storage 720, the O/S 722 may be loaded from the data storage 720 into the memory 704 and may provide an interface between other application software executing on the remote server 700 and hardware resources of the remote server 700. More specifically, the O/S 722 may include a set of computer-executable instructions for managing hardware resources of the remote server 700 and for providing common services to other application programs (e.g., managing memory allocation among various application programs). In certain example embodiments, the O/S 722 may control execution of the other program module(s) to for content rendering. The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 700 is a mobile device, the DBMS 724 may be any suitable light-weight DBMS optimized for performance on a mobile device.

Referring now to other illustrative components of the remote server 700, the input/output (I/O) interface(s) 706 may facilitate the receipt of input information by the remote server 700 from one or more I/O devices as well as the output of information from the remote server 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 734 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 700 may further include one or more network interface(s) 708 via which the remote server 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna(s) 734 may include any suitable type of antenna depending, for example, on the communications protocols used to transmit or receive signals via the antenna(s) 734. Non-limiting examples of suitable antennas may include directional antennas, non-directional antennas, dipole antennas, folded dipole antennas, patch antennas, multiple-input multiple-output (MIMO) antennas, or the like. The antenna(s) 734 may be communicatively coupled to one or more transceivers 712 or radio components to which or from which signals may be transmitted or received.

As previously described, the antenna(s) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 734 may be configured to transmit or receive radio frequency signals within any suitable frequency range forming part of the unlicensed portion of the radio spectrum.

The antenna(s) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 734—transmitting or receiving radio frequency (RF) signals in the bandwidth and/or channels corresponding to the communications protocols utilized by the remote server 700 to communicate with other devices. The transceiver(s) 712 may include hardware, software, and/or firmware for modulating, transmitting, or receiving—potentially in cooperation with any of antenna(s) 734—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the remote server 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 714 may be any device configured to generate audible sound. The optional microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the remote server 700 may include alternate and/or additional hardware, software, or firmware components beyond those described or depicted without departing from the scope of the disclosure. More particularly, it should be appreciated that software, firmware, or hardware components depicted as forming part of the remote server 700 are merely illustrative and that some components may not be present or additional components may be provided in various embodiments. While various illustrative program module(s) have been depicted and described as software module(s) stored in data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by one or more computer processors coupled to memory, a first user identifier of a first user present in a virtual environment;
   determining a first set of music preferences of the first user based at least in part on music presented in association with the first user identifier over a time interval;
   determining a second user identifier of a second user present in the virtual environment;
   determining a second set of music preferences of the second user based at least in part on music presented in association with the second user identifier over the time interval;
   generating, using a first machine learning model, a first playlist of songs using the first set of music preferences and the second set of music preferences for presentation to the first user and the second user, the first playlist comprising a first song and a second song;
   causing audible presentation of the first song;
   determining a third user identifier of a third user present in the virtual environment;
   determining a third set of music preferences of the third user based at least in part on music presented in association with the third user identifier over the time interval;
   generating, using the first machine learning model, a second playlist of songs using the first set of music preferences, the second set of music preferences, and the third set of music preferences for presentation to the first user, the second user, and the third user, the second playlist comprising the first song and a third song;
   determining, using a second machine learning model, a first probability value indicative of a likelihood that a majority of users will like the first song;
   determining, using the second machine learning model, a second probability value indicative of a likelihood that a majority of users will like the third song;
   determining that the second probability value is greater than the first probability value; and
   causing audible presentation of the third song before a fourth song in the second playlist.

2. The method of claim 1, further comprising:
   determining that the second user is no longer present in the environment;
   generating, using the first machine learning model, a third playlist of songs using the first set of music preferences and the third set of music preferences for presentation to the first user, and the third user, the third playlist comprising a fourth song; and
   causing audible presentation of the fourth song.

3. The method of claim 1, wherein the first song and the third song are not found in a first listening history associated with the first user identifier and a second listening history associated with the third user identifier.

4. A method comprising:
   determining, by one or more computer processors coupled to memory, a first user identifier of a first user present in an environment;
   determining a first set of media preferences of the first user based at least in part on media presented in association with the first user identifier;
   determining a second user identifier of a second user present in the environment;
   determining a second set of media preferences of the second user based at least in part on media presented in association with the second user identifier;
   generating, using a first machine learning model, a first playlist of media using the first set of media preferences and the second set of media preferences for presentation to the first user and the second user, the first playlist comprising first media and second media;
   causing presentation of a segment of the first media having a first length;
   determining, using a second machine learning model, that a first probability value indicative of a likelihood that a majority of users will like the first media is greater than a threshold; and
   after audible presentation of the segment of the first media, causing presentation of a segment of the second media having a second length that is shorter than the first media.

5. The method of claim 4, further comprising:
   determining a third user identifier of a third user present in the environment;
   determining a third set of media preferences of the third user based at least in part on media presented in association with the third user identifier; and
   generating, using the first machine learning model, a second playlist of media using the first set of media preferences, the second set of media preferences, and the third set of media preferences for presentation to the first user, the second user, and the third user, the second playlist comprising the first media and third media.

6. The method of claim 5, further comprising:
   determining that the second user is no longer present in the environment; and
   generating, using the first machine learning model, a third playlist of media using the first set of media preferences and the third set of media preferences for presentation to the first user, and the third user.

7. The method of claim 5, further comprising:
   determining, using the second machine learning model, a second probability value indicative of a likelihood that a majority of users will like the third media;
   determining that the second probability value is greater than the first probability value; and
   causing presentation of the third media before the first media.

8. The method of claim 4, further comprising:
   prioritizing presentation of the first media before the second media based at least in part on a number of users present in the environment that like the first media.

9. The method of claim 4, wherein the first media and the second media are not found in a first media consumption history associated with the first user identifier and a second media consumption history associated with the second user identifier.

10. The method of claim 4, wherein the first media is found in a first media consumption history associated with the first user identifier, and the first media is not found in a second media consumption history associated with the second user identifier, the method further comprising:
generating a question associated with the first media; and
presenting the question to users present in the environment.

11. The method of claim 4, further comprising:
determining a set of feedback signals during presentation of the first playlist of media; and
generating, using the first machine learning model, a second playlist of media using the set of feedback signals.

12. The method of claim 4, wherein the environment is a virtual environment, and wherein determining the first user identifier of the first user present in the virtual environment comprises:
determining a set of user identifiers in attendance at the virtual environment; and
determining the first user identifier using the set of user identifiers.

13. The method of claim 12, wherein audible presentation of the first media is synchronized across a plurality of devices.

14. The method of claim 4, wherein the environment is a physical environment, and wherein determining the first user identifier of the first user present in the physical environment comprises:
detecting a first user device in the physical environment; and
determining the first user identifier associated with the first user device.

15. The method of claim 4, further comprising:
determining a location associated with the environment;
wherein generating the first playlist of media comprises generating, using the first machine learning model, the first playlist of media using the location, the first set of media preferences, and the second set of media preferences.

16. A system comprising:
memory configured to store computer-executable instructions; and
at least one computer processor configured to access the memory and execute the computer-executable instructions to:
determine a first user identifier of a first user present in an environment;
determine a first set of media preferences of the first user based at least in part on media presented in association with the first user identifier;
determine a second user identifier of a second user present in the environment;
determine a second set of media preferences of the second user based at least in part on media presented in association with the second user identifier;
generate, using a first machine learning model, a first playlist of media using the first set of media preferences and the second set of media preferences for presentation to the first user and the second user, the first playlist comprising first media and second media;
cause audible presentation of the first media;
generate, using the first machine learning model, a second playlist of media for presentation to the first user using the first set of media preferences, the second set of media preferences, and a third set of media preferences associated with a third user, the second playlist comprising the first media and third media;
determine, using a second machine learning model, a first probability value indicative of a likelihood that a majority of users will like the first media;
determine, using the second machine learning model, a second probability value indicative of a likelihood that a majority of users will like the third media;
determine that the second probability value is greater than the first probability value; and
cause presentation of the third media before the first media.

17. The system of claim 16, wherein the at least one processor is further configured to access the memory and execute the computer-executable instructions to:
determine a third user identifier of the third user present in the environment; and
determine the third set of media preferences of the third user based at least in part on media presented in association with the third user identifier.

18. The system of claim 17, wherein the at least one processor is further configured to access the memory and execute the computer-executable instructions to:
determine that the second user is no longer present in the environment; and
generate, using the first machine learning model, a third playlist of media using the first set of media preferences and the third set of media preferences for presentation to the first user, and the third user.

* * * * *